(No Model.)

J. H. WEITMYER.
STEAM PACKING.

No. 525,063. Patented Aug. 28, 1894.

Witnesses:
J. M. Fowler Jr.
Thomas Durant

Inventor
John H. Weitmyer
By Church & Church
his Attorneys

UNITED STATES PATENT OFFICE.

JOHN H. WEITMYER, OF NEW YORK, N. Y.

STEAM-PACKING.

SPECIFICATION forming part of Letters Patent No. 525,063, dated August 28, 1894.

Application filed June 6, 1894. Serial No. 513,700. (No model.)

*To all whom it may concern:*

Be it known that I, JOHN H. WEITMYER, of New York city, in the county of New York and State of New York, have invented certain new and useful Improvements in Steam-Packings; and I do hereby declare the following to be a full, clear, and exact description of the same, reference being had to the accompanying drawings, forming a part of this specification, and to the letters of reference marked thereon.

This invention relates to improvements in packings or glands for the piston rods of steam engines, and has for its object the production of a simple, steam tight, self oiling structure which will hug the rod closely and at the same time be easily and accurately adjusted without necessitating the removal of the top of the gland or casing.

The invention consists in certain novel details of construction and combinations and arrangements of parts, all as will be now described, and pointed out particularly in the appended claims.

Figure 1:
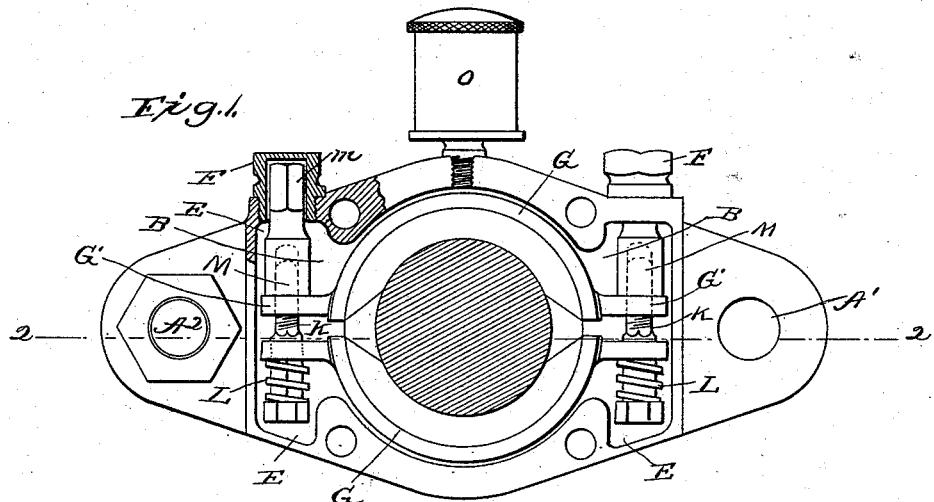
Figure 2:
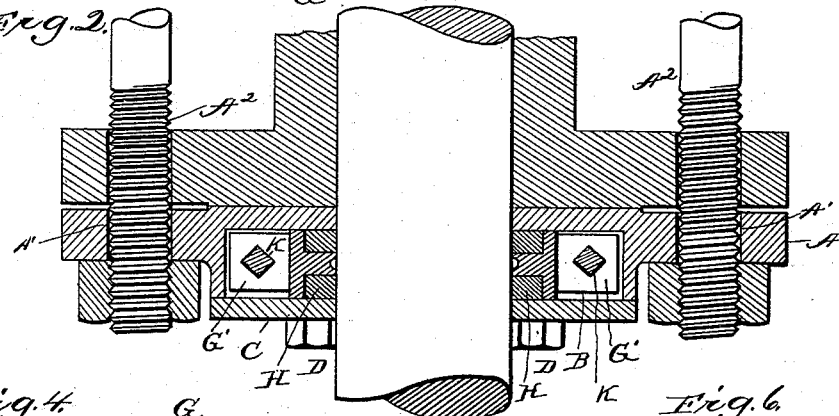
Figure 4:
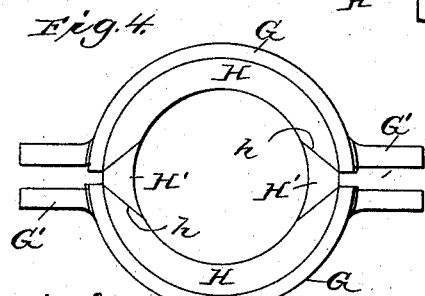
Figure 6:
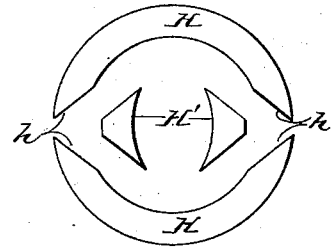
Figure 3:
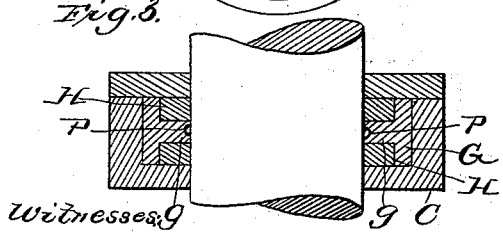
Figure 5:
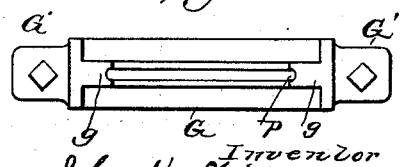

Referring to the accompanying drawings:—Figure 1 is an elevation of a gland embodying my invention, with the cover removed and a portion broken away to show internal construction. Fig. 2 is a section on the line 2—2, Fig. 1, showing the complete device and a section of the piston rod and cylinder connection. Fig. 3 is a section taken at right angles to Fig. 2. Fig. 4 is a plan of the metallic packing rings and holding segments. Figs. 5 and 6 are detail views of one of the holding segments and packing rings respectively.

Like letters of reference in the several figures denote the same parts.

For the purposes of the present invention a casing A is provided preferably of proper shape to fit the face of the cylinder head projection, or stuffing box, and having bolt openings, such as A' therethrough for the reception of bolts A² which hold the casing tightly in place. The casing A is provided with an aperture registering with the ordinary aperture in the cylinder head for the passage of the piston rod, and surrounding said aperture is the chamber B for the reception of the packing rings to be presently described. The face of the casing is ground for the reception of a cover C adapted to be secured in place by bolts D screwing into the casing, and in one edge it is provided with openings E leading into the chamber and having tight fitting internally recessed screw caps F. These openings are preferably extended in substantially straight lines within the casing and tangential to the piston rod.

Within the chamber B are mounted two semi-circular or segmental packing ring holders G each having a central ring section g which fits accurately around the piston and oppositely projecting ears or lugs G'. Above and below the central ring, seats are ground for the metallic packing rings each of the latter consisting in the preferred construction, of two segments H each segment having its inner portion tapered or cut away at the ends as at h to form angular recesses for the accommodation of smaller segmental sections H' the latter being similarly cut away on the outer side. By this construction, when the segments H are moved toward each other as by drawing the holders together, there will be a wedging action at the ends and the wedge pieces will be forced inward in exact proportion to the movement of the segments H and hence the diameter of the circle will be evenly decreased while perfectly steam tight joints are maintained between the sections. One of these packing rings is seated above and the other below the central ring in the holders and the depth of the chamber is such that the outer sides of the packing rings will seat against ground surfaces in the bottom of the chamber and inner surface of the top respectively.

The ears or lugs G' on the holders when in place within the chamber, project into position to receive spring bolts K preferably of the construction shown, i. e., having squared shanks passing through similar openings in the ears and surrounded by a spring L. The screw threaded ends of the bolts toward the openings in the casing are adapted for the reception of nuts M provided with squared shanks m projecting through the aforesaid openings in the casing, but covered by the hollow caps.

When the device is in place, it will now be understood that the rings may be quickly and easily adjusted without stopping the engine and without the necessity of taking off the top of the casing, for by simply removing the caps F a wrench may be applied to the adjusting screws and the adjustment made as desired. This adaptability for tight closing is utilized in making the chamber an oil reservoir supplied from an oil receiver, such as O, and in order that the oil may be supplied in a thin even film at the most essential point, the ring projection in the holders is formed with a central groove P which permits the oil to flow around the rod at the very center of the packing and hence in the position best calculated to effect perfect lubrication of the rod.

Having thus described my invention, what I claim as new is—

1. In a steam packing, the combination with the casing having the central chamber around the piston rod opening, and a transverse aperture in the edge, of the packing ring, an adjustable holder therefor, and an adjusting screw for said holder projecting out through the transverse aperture; substantially as described.

2. In a steam packing, the combination with the casing having the central chamber around the piston rod opening and the transverse apertures in the edge leading into opposite sides of the chamber, of the packing ring, adjustable segmental holders therefor having ears projecting from each end into alignment with the transverse apertures, the adjusting screws for drawing said ears together projecting through the apertures and the hollow caps closing said apertures and covering the ends of the screws; substantially as described.

3. In a steam packing, the combination with the casing having the chamber surrounding the piston rod opening with the transverse apertures for the adjusting screws, of the segmental packing ring holders having the laterally projecting ears and the internal integral ring projection fitting the rod with seats on each side of said ring projection, and packing rings on said seats; substantially as described.

4. In a steam packing, the combination with the casing having the chamber surrounding the piston rod opening with the transverse apertures for the adjusting screws, and caps closing said apertures, of the packing ring holder formed of segments having laterally projecting ears and internal ring projection grooved for the distribution of oil, packing rings supported by the holder above and below the ring projection, adjusting screws uniting the ears of the holders and an oil supply opening leading to the chamber in the casing; substantially as described.

5. In a steam packing, the combination with the casing, of the segmental packing ring holder having outwardly projecting ears and adjusting screws connecting said ears, of the segmental packing rings located in the sections of the holder and having the inner faces of the ends beveled outward, and the wedge sections having similarly inclined outer surfaces and located across or bridging the spaces between the sections of the holder; substantially as described.

JOHN H. WEITMYER.

Witnesses:
JAMES J. HICKS,
JOHN C. GRISWOLD.